(12) United States Patent
Kim et al.

(10) Patent No.: US 8,472,678 B2
(45) Date of Patent: Jun. 25, 2013

(54) METHOD AND SYSTEM FOR MATCHING PANORAMIC IMAGES USING A GRAPH STRUCTURE, AND COMPUTER-READABLE RECORDING MEDIUM

(75) Inventors: Tae Hoon Kim, Gyeonggi-do (KR); Jung Hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/375,216

(22) PCT Filed: Sep. 6, 2010

(86) PCT No.: PCT/KR2010/006051
§ 371 (c)(1),
(2), (4) Date: Nov. 29, 2011

(87) PCT Pub. No.: WO2011/034308
PCT Pub. Date: Mar. 24, 2011

(65) Prior Publication Data
US 2012/0076426 A1    Mar. 29, 2012

(30) Foreign Application Priority Data
Sep. 16, 2009  (KR) .................. 10-2009-0087797

(51) Int. Cl.
*H04N 7/00*     (2011.01)
*G06T 15/00*    (2011.01)
*G06K 9/00*     (2006.01)
*G06T 15/10*    (2011.01)
*G06K 9/62*     (2006.01)

(52) U.S. Cl.
USPC ........... 382/113; 382/209; 345/419; 345/427; 348/36

(58) Field of Classification Search
None
See application file for complete search history.

(56) References Cited

U.S. PATENT DOCUMENTS

| | | | |
|---|---|---|---|
| 2007/0273758 A1* | 11/2007 | Mendoza et al. | 348/39 |
| 2008/0143727 A1 | 6/2008 | Oh et al. | |
| 2009/0213112 A1* | 8/2009 | Zhu et al. | 345/419 |
| 2011/0211040 A1* | 9/2011 | Lindemann et al. | 345/419 |

FOREIGN PATENT DOCUMENTS

| | | | |
|---|---|---|---|
| KR | 10-2008-0028698 A | 4/2008 | |
| KR | 10-2008-0096006 A | 10/2008 | |

* cited by examiner

*Primary Examiner* — Amir Alavi
*Assistant Examiner* — Kenny Cese
(74) *Attorney, Agent, or Firm* — Blakely, Sokoloff, Taylor & Zafman LLP

(57) ABSTRACT

The present invention relates to a method for performing an image matching process for panoramic images. The method includes the steps of: (a) creating a connection(s) among images of a specific object respectively included in at least two panoramic images, if some objects included in the at least two panoramic images are recognized as the specific object by referring to information on shooting places of multiple panoramic images and information on directions of respective objects on the multiple panoramic images; and (b) matching an image of a certain object inputted as a query with at least one of images included in a specific connection and providing a search result for the query by referring to a result of the image matching process and the specific connection.

21 Claims, 9 Drawing Sheets

710

610

710

810

910

METHOD AND SYSTEM FOR MATCHING PANORAMIC IMAGES USING A GRAPH STRUCTURE, AND COMPUTER-READABLE RECORDING MEDIUM

CROSS REFERENCE TO RELATED APPLICATIONS

This application is a U.S. National Phase Application of International Application PCT Application No. PCT/KR2010/006051 filed on Sep. 6, 2010, which claims the benefit of priority from Korean Patent Application No. 10-2009-0087797 filed on Sep. 16, 2009. The disclosures of International Application PCT Application No. PCT/KR2010/006051 and Korean Patent Application No. 10-2009-0087797 are incorporated herein by reference.

FIELD OF THE INVENTION

The present invention relates to a method, a system and a computer-readable recording medium for applying image matching operations to multiple panoramic images by using graph structures; and more particularly, to the method, the system and the computer-readable recording medium for providing a result of the image matching process for a queried image, if received, rapidly by creating a particular graph structure by referring to multiple images including the same object among the multiple panoramic images shot in different places and by providing correspondence relationships among the multiple images including the same object.

BACKGROUND OF THE INVENTION

Recently, due to the wide spread use of the Internet, it has been common to provide information converted to a digital form. Typical examples of digitalized geographic information may include online map services, car navigation systems, etc. As such, one of benefits of the digitalized geographic information is to provide a variety of convenient functions for users by combining them with user interfaces capable of providing a retrieval function. Further, changes in geographic information may be easily updated through remote updating services, etc., so that, in the aspect of latest geographic information, such digital data may be predominant over conventional printed materials.

However, it has been conventionally common for service providers to combine digital maps generated by the combination of simple symbols with search interfaces and provide digital geographic information, but since there are apparent differences between information of areas displayed on the digital map and real information of the areas, it is difficult to identify the real information of the areas from the digital map.

As an attempt to solve such a problem, US Laid-Open Publication No. 2008-143727 dated Jun. 19, 2008 discloses a technology for providing a panoramic image(s) relating to a certain place such as a bystreet, a road, etc. appearing on the digital map and, if a user selects a specific pixel with an arrow, etc. on the panoramic image, offering data of a different panoramic image corresponding to a place shown at the specific pixel. Accordingly, users may identify real information of the certain place on the digital map and inquire for another panoramic image which expresses geographic information at the certain place shown on the panoramic image the user is now inquiring for in a more detail through a link between panoramic images.

In addition, a technology which performs visual search by using a panoramic image(s) has been introduced. According to the technology, by referring to a queried image inputted by a user, it may retrieve an appropriate panoramic image including what is similar to the object included in the queried image among multiple panoramic images and provide the appropriate panoramic image to the user.

However, according to the technology of performing visual search by using the panoramic images, since the image matching operations for comparing the queried image with all the panoramic images stored in the database must be performed, the execution time for the image matching process becomes more increased and degrees of precision of the image matching process become lower.

SUMMARY OF THE INVENTION

It is, therefore, one object of the present invention to solve all the problems mentioned above.

It is another object of the present invention to create a certain graph structure by using multiple images including the same object among multiple panoramic images shot in different places and thereby, if a queried image including a specific object is inputted, to provide a result of an image matching process more rapidly and more precisely.

It is still another object of the present invention to increase degree of precision in the image matching process by deleting some matched images not in a specific graph structure from the result of the image matching process, if a majority of matched images are included in the specific graph structure.

In accordance with one aspect of the present invention, there is provided a method for performing an image matching process for panoramic images, including the steps of: (a) creating a connection(s) among images of a specific object respectively included in at least two panoramic images, if some objects included in the at least two panoramic images are recognized as the specific object by referring to information on shooting places of multiple panoramic images and information on directions of respective objects on the multiple panoramic images; and (b) matching an image of a certain object inputted as a query with at least one of images included in a specific connection and providing a search result for the query by referring to a result of the image matching process and the specific connection.

In accordance with another aspect of the present invention, there is provided a system for performing image matching process for panoramic images, including: a graph structure creating part for creating a connection(s) among images of a specific object respectively included in at least two panoramic images, if some objects in the at least two panoramic images are recognized as the specific object by referring to information on shooting places of multiple panoramic images and information on directions of respective objects on the multiple panoramic images; and a query performing part for matching an image of a certain object inputted as a query with at least one of images included in a specific connection and providing a search result for the query by referring to a result of the image matching process and the specific connection.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
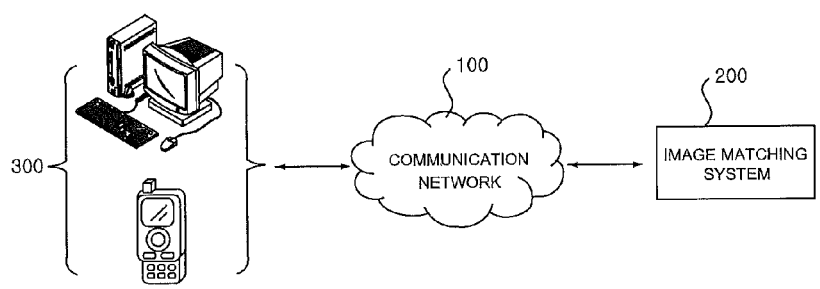
FIG. 1 is a drawing exemplarily illustrating a configuration of an entire system to provide an image matching service for panoramic images by using graph structures in accordance with an example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Herein, a panoramic image means an image acquired as a result of photographing a complete view from a point and more particularly, a type of the image capable of offering visual information on all directions actually shown at a shooting point three-dimensionally and realistically by expressing pixels constructing the image on a virtual celestial sphere whose center is the shooting point according to spherical coordinates. Further, the panoramic image may be an image expressing the pixels constructing the image according to cylindrical coordinates.

Configuration of Entire System

FIG. 1 visually illustrates a configuration of an entire system to provide an image matching service for panoramic images by using graph structures in accordance with an example embodiment of the present invention.

As illustrated in FIG. 1, the entire system in accordance with an example embodiment of the present invention may include a communication network 100, an image matching system 200 which provides an image matching service for panoramic images by using graph structures, and a user terminal 300.

First of all, the network 100 may be configured, regardless of wired or wireless, in a variety of networks, including a local area network (LAN), a metropolitan area network (MAN), a wide area network (WAN), etc. More preferably, the network 100 in the present invention may be the World Wide Web (www)

To provide a visual search service for retrieving an appropriate panoramic image(s) by using a graph structure, the image matching system 200 in accordance with an example embodiment of the present invention may perform a function of creating the graph structure to express correspondence relationships among images of respective objects appearing in at least two multiple panoramic images, if the respective objects appearing in the at least two panoramic images are recognized as a specific object by referring to locations of the panoramic images and directions of the respective objects appearing therein.

Furthermore, the image matching system 200 in accordance with an example embodiment of the present invention may carry out a function of matching a queried image including the specific object with at least one of images included in the above-mentioned graph structure and providing an appropriate matched image and images connected therewith by the graph structure as a search result of the query. The detailed explanation on the internal configuration of the image matching system 200 will be made below.

Moreover, the user terminal 300 in accordance with an example embodiment of the present invention is a digital device which includes a function to enable the user to access to the image matching system 200 and then communicate with the system 200. Herein, digital devices, including a personal computer (e.g., desktop, laptop, etc.), a workstation, a PDA, a web pad, a cellular phone, which have memory means and micro processors with a calculation ability, may be adopted as the user terminal 300 in accordance with the present invention.

Configuration of Image Processing System

Below is a detailed explanation on an internal configuration of the image matching system 200 which performs an important function for the implementation of the present invention and its components.

Figure 2:
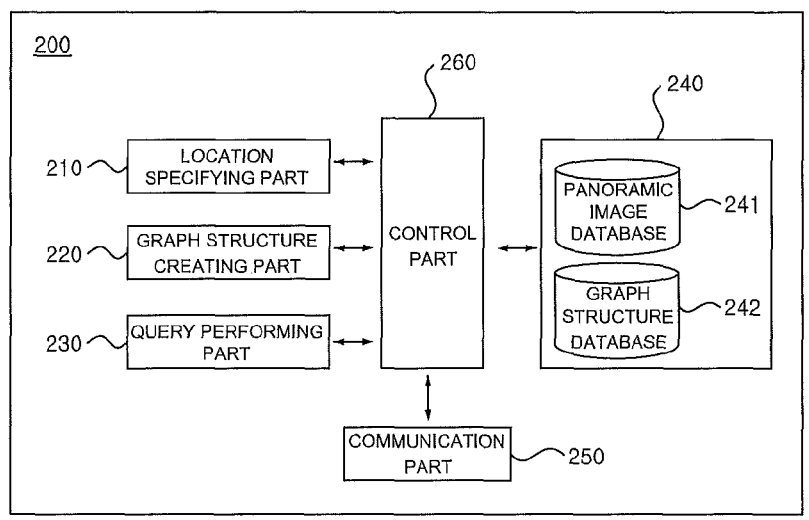
FIG. 2 is a diagram exemplarily clarifying an internal configuration of an image matching system in accordance with an example embodiment of the present invention.

FIG. 2 exemplarily represents the internal configuration of an image matching system 200 in accordance with an example embodiment of the present invention.

By referring to FIG. 2, the image matching system 200 in accordance with an example embodiment of the present invention may include a location specifying part 210, a graph structure creating part 220, a query performing part 230, a database managing part 240, a communication part 250 and a control part 260. Herein, the database managing part 240 may include a panoramic image database 241 and a graph structure database 242. In accordance with an example embodiment of the present invention, at least some of the location specifying part 210, the graph structure creating part 220, the query performing part 230, the database managing part 240, the communication part 250 and the control part 260 may be program modules communicating with the user terminal 300. The program modules may be included in the image matching system 200 in a form of an operating system, an application program module and other program module and may be also stored on several memory devices physically. Furthermore, the program modules may be stored on remote memory devices communicable to the image matching system 200. The program modules may include but not be subject to a routine, a subroutine, a program, an object, a component, and a data structure for executing a specific operation or a type of specific abstract data that will be described in accordance with the present invention.

First of all, in accordance with an example embodiment of the present invention, the location specifying part 210 may perform a function of specifying shooting places of multiple panoramic images by referring to coordinates, i.e., latitude, longitude and altitude, of the places where the panoramic images were taken. In accordance with an example embodiment of the present invention, the respective panoramic images and the corresponding coordinates of their shooting places (latitude, longitude and altitude) may be stored onto the panoramic image database 241.

Figure 3:
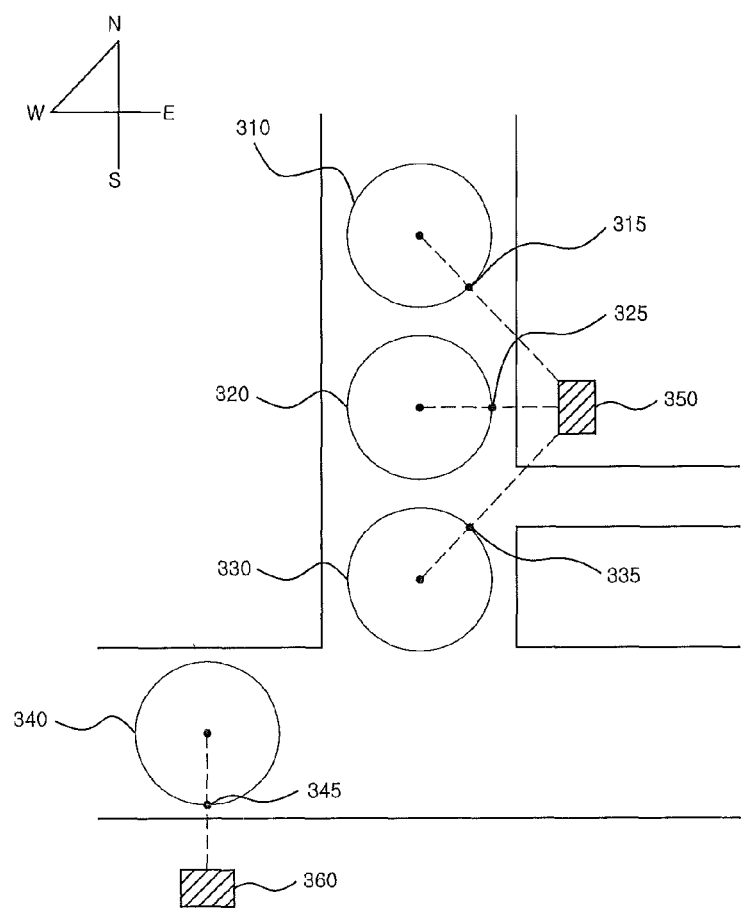
FIG. 3 is a diagram showing location relationships among panoramic images shot in different places in accordance with an example embodiment of the present invention.

FIG. 3 is an exemplary diagram illustrating the location relationships among panoramic images shot in different places in accordance with an example embodiment of the present invention.

By referring to FIG. 3, four panoramic images 310, 320, 330 and 340 in accordance with an example embodiment of the present invention are shot in four different places. Herein, the respective locations of the four panoramic images may be specified by the coordinates of the respective shooting places.

In accordance with an example embodiment of the present invention, the graph structure creating part 220 may perform a function of creating a graph structure to show correspondence relationships among the images of the specific object included in the at least two panoramic images if each object, e.g., a building, etc., respectively included in each of at least two panoramic images is recognized as the specific object by referring to directions to which the respective objects are located with the respective shooting places of the panoramic images as reference points.

The graph structure, herein, means a mathematical structure expressing relationships among multiple objects included in a special group by graphs and may consist of nodes connected by edges. In accordance with an example embodiment of the present invention, each node in the graph structure where the nodes are connected by the edges may include each image of the specific object appearing in each of the panoramic images. Herein, the connection of the nodes by the edges means that respective images corresponding to the respective nodes connected by the edges includes the same object.

In accordance with an example embodiment of the present invention, information on the graph structure created with respect to a random object may be stored on the graph structure database 242. The graph structure database 242 may store a separate data structure regarding the nodes and the edges which form the graph structure, but it is not limited only to this and it will be able to reproduce the present invention by applying various methods, including a method of creating relationships of connection among the multiple object images themselves in the multiple panoramic images or the like.

In accordance with an example embodiment of the present invention, a process of recognizing a certain object as the same object as an object A, i.e., a process of determining whether the certain object is recognized as the same object as the object A or not) and a process of creating the graph structure will be explained as follows:

First, whether the object A is included in each of the multiple panoramic images or not is determined. Herein, whether the object A is included only in panoramic images shot around the place where the object A is located may be considered to enhance the efficiency of object recognition. The panoramic images shot around the place where the object A is located may be selected by referring to the coordinates of the shooting places of the panoramic images. Next, directions of the object A from the respective shooting places of the panoramic images are measured. Thereafter, whether the objects, which seem to be the object A, included in each of the n panoramic images are the same as the real object A or not is identified by referring to the coordinates of the shooting places of the n panoramic images and the directions of the object A.

For instance, by referring to FIG. 3, it may be assumed that first, second and third panoramic images 310, 320 and 330 have been shot on a first road straight from north to south and shooting places of the three images are located on the same longitudinal line along the first road; a fourth panoramic image 340 has been shot on a second road at right angles to the first road and a shooting place of the fourth panoramic image 340 is located far from those of the first through the third panoramic images; and an object A 350 is located east on the same latitude from the shooting place of the second panoramic image and an object B 360 with a similar appearance to the object A 350 is located in the southern part on the same longitude from the shooting place of the fourth panoramic image 340. In the case, the object A may be displayed to be located (i) in the southeast 315 from the shooting place of the first panoramic image 310 on the first panoramic image 310, (ii) in the east 325 from that of the second panoramic image 320 on the second panoramic image 320; and (iii) in the northeast 335 from that of the third panoramic image 330 on the third panoramic image 330. Besides, the object B 360 with the similar appearance as the object A 350 may be displayed in the south 345 from the shooting place of the fourth panoramic image 340 thereon. In accordance with an example embodiment of the present invention, the graph structure creating part 220, thereby, may determine that the respective objects A included in the first through the third panoramic images are the same object and the object B included in the fourth panoramic image is non-identical to the object A even though it has the similar appearance to the object A by referring to the coordinates of the shooting places of the first through the fourth panoramic images and the directions of the respective objects A 350 in the first through the third panoramic images and the object B 360 in the fourth panoramic image.

In accordance with an example embodiment of the present invention, the graph structure showing the correspondence relationships among the images 315, 325 and 335 of the object A 350 in the first through the third panoramic images 310, 320 and 330 may be created, wherein the images 315, 325 and 335 of the object A 350 are acquired by extracting only what corresponding to the respective regions of the object A 350 therein.

Figure 4:
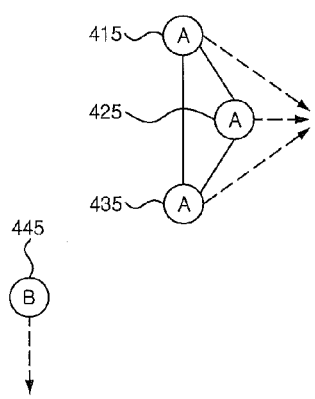
FIG. 4 is a diagram exemplarily representing a concept map of the graph structures in accordance with an example embodiment of the present invention.

FIG. 4 exemplarily illustrates a concept map of the graphic structures in accordance with an example embodiment of the present invention.

By referring to FIG. 4, a first through a third nodes 415, 425 and 435 in a first graph structure may include information on the images 315, 325 and 335 of the object A in the first through the third panoramic images and a fourth node 445 in a second graph structure may include information on the image 345 of the object B in the fourth panoramic image. As described above, since the respective objects A in the first through the third panoramic images are recognized as the same object, i.e., the real object A, the first through the third nodes 415, 425 and 435, which correspond to the images 315, 325 and 335 of the object A in the first through the third panoramic images, may be connected with one another. In short, object images included in the multiple nodes connected by the edges in the first graph structure as illustrated in FIG. 4 mean the images of the same object, i.e., the real object A.

As mentioned above, to recognize the respective objects displayed on the multiple panoramic images acquired as a result of shooting the object A at different angles and from different distances as the real object A, an object recognition technology may be adopted. As the object recognition technology in accordance with an example embodiment of the present invention, an article titled "A Comparison of Affine Region Detectors" authored jointly by K. MIKOLAJCZYK and seven others and published in "International Journal of Computer Vision" in November 2005 and the like may be referred to (The whole content of the article may be considered to have been combined herein). To recognize the respective objects shot at different angles as the same object more precisely, the aforementioned article describes how to detect an affine invariant region. Of course, the object recognition technology applicable to the present invention is not limited only to the method described in the article and it will be able to reproduce the present invention by applying various examples.

In accordance with an example embodiment of the present invention, the query performing part 230, in addition, may perform a function of providing a retrieval result of a queried image rapidly by referring to the graph structures pre-created by the graph structure creating part 220. More specifically, if an image including a specific object is inputted as the queried image, the query performing part 230 in accordance with an example embodiment of the present invention may match at least one of object images included in a specific graph structure with the queried image and thereby provide as a search result a matched object image (s) included in the specific graph structure and other object image (s) connected therewith by the specific graph structure.

For another example, if the image including the specific object is inputted as the queried image, the query performing part 230 in accordance with an example embodiment of the present invention may match at least one object image included in the plurality of graph structures with the queried image and, if a majority of matched object images are determined to be included in the specific graph structure by referring to correspondence relationships between the respective matched object images and their respective graph structures, the query performing part 230 may provide information on the object (e.g., information on a text, an image, etc. regarding the object) included in the specific graph structure.

Figure 5:
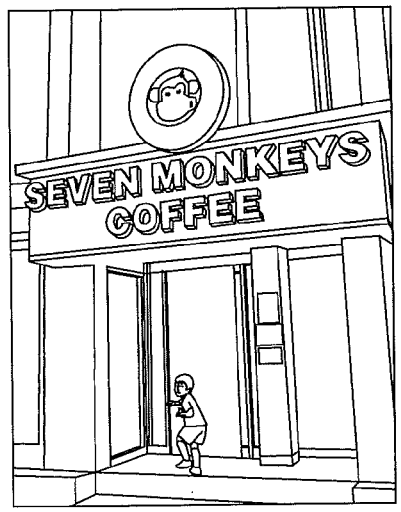
FIG. 5 is a diagram exemplarily showing an inputted queried image in accordance with an example embodiment of the present invention.

FIG. 5 exemplarily illustrates an inputted queried image in accordance with an example embodiment of the present invention.

Further, FIGS. 6 through 9 exemplarily show the first through the fourth panoramic images shot in different shooting places as illustrated in FIG. 3 in accordance with an example embodiment of the present invention.

Figure 6:
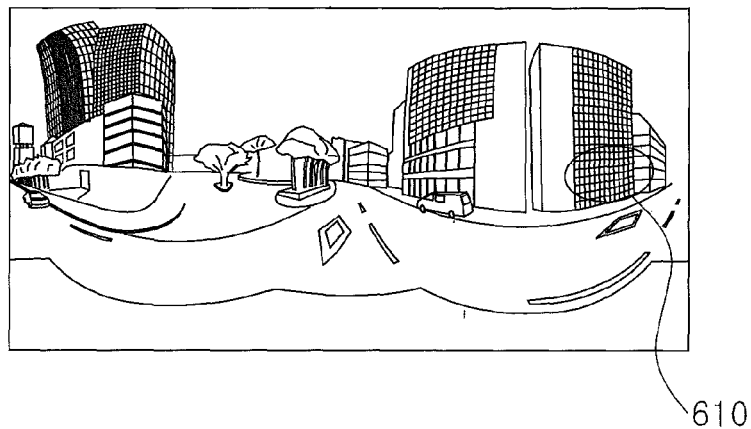
FIGS. 6 through 9 are diagrams exemplarily illustrating 1st through 4th panoramic images shot in different places as depicted in FIG. 3 in accordance with an example embodiment of the present invention.

The query performing part 230 in accordance with an example embodiment of the present invention may determine that an image 610 of the object A in the first panoramic image of FIG. 6 is matched with the queried image of FIG. 5 by applying the image matching process to the queried image of FIG. 5. That is, the query performing part 230 may basically provide the image 610 of the object A in the first panoramic image of FIG. 6 as a result of retrieval for the query. Furthermore, the query performing part 230 in accordance with an example embodiment of the present invention may additionally provide an image 710 of the object A in the second panoramic image of FIG. 2 and an image 810 of the object A in the third panoramic image of FIG. 8, which are connected with the image 610 of the object A in the first panoramic image of FIG. 6 by the specific graph structure as the result of the retrieval for the query (see FIG. 4). However, the query performing part 230 may not provide an image 910 of the object B in the fourth panoramic image of FIG. 9 which is not connected with the image 610 of the object A in the first panoramic image of FIG. 6 by the specific graph structure (see FIG. 4).

Figure 7:
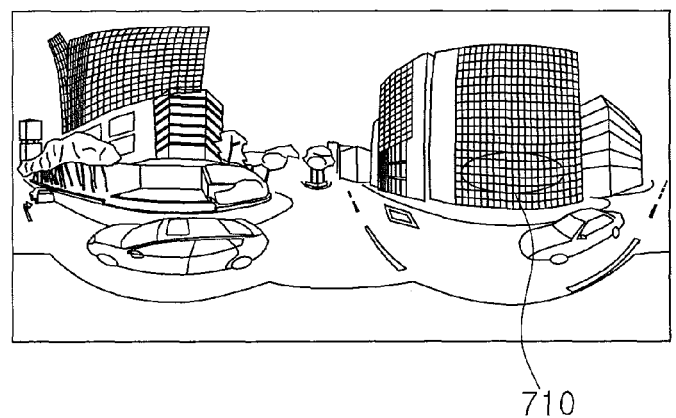
Figure 8:
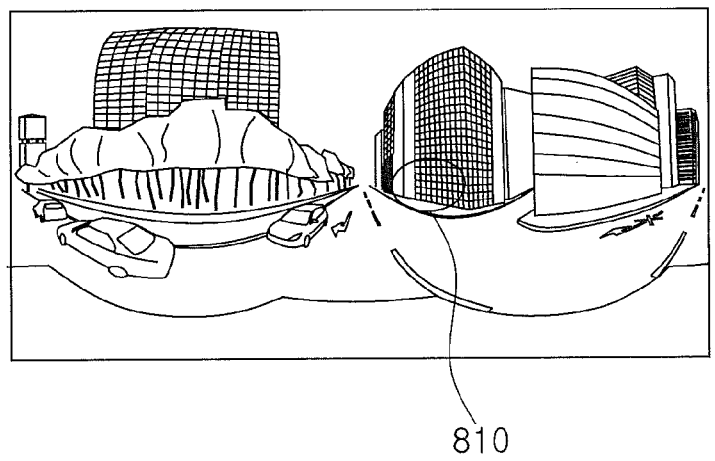
Figure 9:
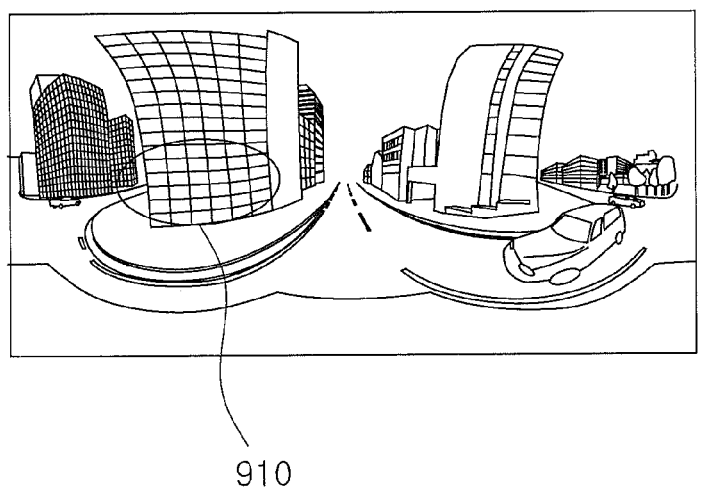

For another instance, as a result of performing the image matching process for the queried image as shown in FIG. 5, the query performing part 230 in accordance with an example embodiment of the present invention may select the image 610 of the object A in the first panoramic image of FIG. 6, the image 710 of the object A in the second panoramic image of FIG. 7, the image 810 of the object A in the third panoramic image of FIG. 8 and the image 910 of the object B in the fourth panoramic image of FIG. 9 as a result of a first step of the image matching process. Thereafter, the query performing part 230 may delete the image 910 of the object B in the fourth panoramic image of FIG. 9 which is not included in the specific graph structure from the result of the first step of the image matching process, and offer, as a result of a second step of the image matching process, information on the object A which is pointed out by all the images included in the specific graph structure, i.e., the image 610 of the object A, the image 710 of the object A and the image 810 of the object A.

In accordance with an example embodiment of the present invention, the panoramic image database 241 may store multiple panoramic images shot in different shooting places associated with the coordinates of the shooting places, i.e., latitude, longitude and altitude, and the graph structure database 242 may store information on the graph structures created in accordance with the present invention.

Herein, the database (s) in the present invention is a concept of a database(s) not only in a narrow meaning but also in a broad meaning which includes data records, etc. based on computer file systems. From the aspect, it must be understood that, even a set of simple operation processing logs may be the database(s) in the present invention if data can be extracted from the set. The image databases 241 and 242 are illustrated in FIG. 2 as if they are included in the image matching system 200, but they may be possibly configured separately from the image matching system 200 at the necessity of those skilled in the art who implement the present invention.

As shown above, in accordance with the present invention, a degree of precision in the image matching process may be improved and the execution time of the image matching process may be drastically reduced because a matched image determined to include what is similar to an object included in the query image and other images connected with the matched image by the specific graph structure are provided as the search result for the query image without matching the queried image with all the images stored in the database after pre-creating the graph structures by referring to the shooting places of the panoramic images and the directions of the respective object on the panoramic images. Besides, if a majority of the matched images in the first step of the image matching process are included in the specific graph structure, a part of the matched image(s) in the first step of the image matching process not in the specific graph structure are determined as noise and deleted from the result of the image matching process, thereby enhancing the degree of precision in the image matching process. Herein, the "majority" of the matched images may represent that ratio of a number of the images included in the specific graph structure to that of all the matched images exceeds the predetermined value.

In accordance with an example embodiment of the present invention, the image matching system 200 may further include a pre-processing part (not illustrated) for identifying obstacles, such as trees, automobiles, faces, etc., which may impair object recognition, in the multiple panoramic images and restoring any region(s) hidden by such obstacles. Since the region(s) hidden by such obstacle(s) on a specific panoramic image may be completely displayed on different panoramic image(s) shot at a place adjacent to the shooting place of the specific panoramic image if a fact that the panoramic images are shot sequentially on the move along a road is considered, the pre-processing part (not illustrated) in accordance with an example embodiment of the present invention may restore the region(s) hidden by the obstacle(s) by comparing multiple panoramic images shot at nearby places with one another.

More specifically, the pre-processing part (not illustrated) in accordance with an example embodiment of the present invention may refer to a size(s) of the obstacle region(s) in order to search the region(s) hidden by the obstacle(s) displayed on a panoramic image more efficiently. For example, on assumption that the region(s) of the obstacle(s), including a tree(s), a face(s), etc., on a panoramic image shot at a long distance may be focused near the horizon with a relatively small size(s), the pre-processing part (not illustrated) in accordance with an example embodiment of the present invention may improve efficiency of retrieval by detecting a region(s) of the obstacle(s) only within a pre-defined pixel size(s) from the horizon.

In accordance with an example embodiment of the present invention, the communication part 250 may perform a function of instructing the image matching system 200 to communicate with an external device such as the user terminal 300.

In accordance with an example embodiment of the present invention, the control part 260, besides, may perform a function of controlling data flow among the location specifying part 210, the graph structure creating part 220, the query performing part 230, the database managing part 240 and the communication part 250. Briefly, the control part 260 may control the flow of data from outside or among the components of the image matching system 200 and allow the location specifying part 210, the graph structure creating part 220, the query performing part 230, the database managing part 240 and the communication part 250 to perform their unique functions.

In accordance with the present invention, it is possible to create the specific graph structure to set correspondence relationships among images of the specific object included in the multiple panoramic images in different fields of view and, if a queried image with the specific object is inputted, to provide images in the pre-created specific graph structure as a result of the image matching process for the queried image to thereby achieve the effect of improving the degree of precision in the image matching process and drastically reducing the execution time for the image matching process.

Furthermore, in accordance with the present invention, if a majority of the matched images are included in the specific graph structure, it will be possible to improve the degree of precision in the image matching process by determining a part of the matched images not in the specific graph structure as noise and removing them from the matching result.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for performing an image matching process for panoramic images comprising:
   creating a connection among images of a specific object respectively included in at least two panoramic images when an object in each of the at least two panoramic images is recognized as being the specific object by referring to information on shooting places of multiple panoramic images and information on directions of respective objects on the multiple panoramic images, wherein each panoramic image expresses a complete view from each shooting place on a virtual celestial sphere whose center is the shooting place; and
   matching an image of a certain object inputted as a query with at least one of said images included in the specific connection and providing a search result for the query by referring to a result of the image matching process and the specific connection.

2. The method of claim 1, wherein a specific matched image and at least one of said images connected therewith by the specific connection are provided as the search result for the query.

3. The method of claim 1, wherein where a ratio of a number of images included in the specific connection as compared to a number of all the matched images exceeds a predetermined value, a part of said matched images not included in the specific connection are deleted from the search result and the other part of said matched images are provided as the search result.

4. The method of claim 1, wherein the directions of the respective specific object are measured from the respective shooting places of the respective panoramic images.

5. The method of claim 1, wherein if a first object considered as the specific object in a first panoramic image is displayed on a half line stretched from a shooting place of the first panoramic image to a location of the first object and a second object considered as the specific object in a second panoramic image is displayed on a half line stretched from a shooting place of the second panoramic image to a location of the second object, the first object and the second object are finally determined to be the specific object.

6. The method of claim 1, wherein the connection is a graph structure in which images of the specific object included in the at least two panoramic images are set as nodes and the nodes are connected by edges.

7. The method of claim 1, further comprising:
identifying an obstacle in the multiple panoramic images and restoring a region of the specific object hidden by the identified obstacle.

8. The method of claim 7, wherein the region of the obstacle is determined by referring to location(s) of the region of the obstacle in the panoramic images and the size thereof.

9. The method of claim 7, wherein the region hidden by the identified obstacle is restored by referring to images of the specific object in different panoramic images on which the specific object is fully taken.

10. A system for performing Image matching process for panoramic images, comprising:
a graph structure creating part for creating a connection among images of a specific object respectively included in at least two panoramic images, where at least one object in each of the at least two panoramic images is recognized as being the specific object by referring to information on shooting places of multiple panoramic images and information on directions of respective objects on the multiple panoramic images, wherein each panoramic image expresses a complete view from each shooting place on a virtual celestial sphere whose center is the shooting place; and
a query performing part for matching an image of a certain object inputted as a query with at least one of images included in a specific connection and providing a search result for the query by referring to a result of the image matching process and the specific connection.

11. The system of claim 10, wherein the query performing part provides as the search result for the query a specific matched image(s) and at least one of said images connected therewith by the specific connection.

12. The system of claim 10, wherein, where a ratio of a number of images included in the specific connection as compared to a number of all the matched images exceeds predetermined value, the query performing part deletes a part of said matched images not included in the specific connection from the search result and provides the other part of said matched images as the search result.

13. The system of claim 10, wherein the directions of the respective specific object are measured from the respective shooting places of the respective panoramic images.

14. The system of claim 10, wherein, if a first object considered as the specific object in a first panoramic image is displayed on a half line stretched from a shooting place of the first panoramic image to a location of the first object and a second object considered as the specific object in a second panoramic image is displayed on a half line stretched from a shooting place of the second panoramic image to the location of the second object, the graph structure creating part finally determines the first object and the second object to be the specific object and creates a connection therebetween.

15. The system of claim 10, wherein the connection is a graph structure in which images of the specific object included in the at least two panoramic images are set as nodes and the nodes are connected by edges.

16. The system of claim 10, wherein a pre-processing part provides a preprocessed panoramic image by identifying an obstacle in the multiple panoramic images and restoring a region of the specific object hidden by the identified obstacle.

17. The system of claim 16, wherein the pre-processing part determines the region of the obstacle by referring to the location of the region of the obstacle in the panoramic images and the size thereof.

18. The system of claim 16, wherein the pre-processing part restores the region hidden by the identified obstacle by referring to images of the specific object in different panoramic images on which the specific object is fully taken.

19. A non-transitory medium recording a computer readable program to execute the method of claim 1.

20. A method comprising:
creating a connection among images of an specific object included in at least two panoramic images when an object in each of a plurality of panoramic images is recognized as being the specific object by referring to information on shooting places of multiple panoramic images and information on directions of respective objects on the multiple panoramic images, wherein the connection is a graph structure in which images of the specific object are included in the at least two panoramic;
images are set as nodes and the nodes are connected by edges;
matching an image of an object inputted as a query with one or more of the images included in the connection;
providing a search result for the query by referring to a result of the image matching process and the specific connection;
identifying an obstacle in the multiple panoramic images; and
restoring a region of the specific object hidden by the identified obstacle.

21. The method of claim 20, wherein a matched image and one or more of the connected images are provided as the search result for the query.

* * * * *